April 23, 1968 F. M. MANION 3,379,203

PURE FLUID AMPLIFIER HAVING POSITIVE AND NEGATIVE OUTPUT PRESSURES

Filed Dec. 15, 1964 2 Sheets-Sheet 1

INVENTOR
FRANCIS M. MANION

BY Hurvitz & Rose
ATTORNEYS

INVENTOR
FRANCIS M. MANION

BY Hurvitz & Rose
ATTORNEYS 3,379,203

PURE FLUID AMPLIFIER HAVING POSITIVE AND NEGATIVE OUTPUT PRESSURES

Francis M. Manion, Rockville, Md., assignor to Bowles Engineering Corporation, Silver Spring, Md., a corporation of Maryland Filed Dec. 15, 1964, Ser. No. 418,416
18 Claims. (Cl. 137—81.5)

The present invention relates to pure fluid operated systems and, more particularly, to a pure fluid analog amplifier having an outlet pressure characteristic which lies in both the negative and positive pressure ranges.

Electronic systems and components are capable of performing functions such as detecting and amplifying a signal. Mechanical systems, utilizing a large number of moving parts, are also known which will perform functions analogous to the functions of electronic systems. However, both electronic and mechanical systems utilize a large number of active elements, a failure in any of which usually results in improper operation of the system.

The present invention relates generally to fluid amplifier systems having no moving solid parts, in which amplification is a function of the magnitude of the deflection of a main stream of fluid by a transverse fluid pressure distribution within a defined interaction region. Systems of this type have been discussed in U.S. Patent No. 3,122,165, granted Feb. 25, 1964.

Fluid amplifiers have been distinguished into two broad classes, which are:

I. Those amplifiers wherein two or more streams of fluid interact so that one or more of the streams deflect another stream with little or no interaction between the sidewalls which define the region of interaction of the streams. These devices of the first class involve an interchange of momenta of the fluid streams.

II. Those amplifiers wherein two or more streams of fluid interact so that the resulting flow patterns and pressure distributions within the interaction region are greatly affected by the details of the configuration of and placement of the sidewalls defining the interaction chamber.

The devices of the second class involve the effect noted by Henri Coanda. This "Coanda" effect or boundary layer occurs when a stream of fluid is issued from an orifice adjacent an inclined or offset surface defining at least one side of the interaction region. As the stream passes through the intersection region, it entrains fluid in this region on both sides of the stream. If only one sidewall is employed or the stream is closer to one sidewall than the other, where two sidewalls are employed, the stream is more effective in removing fluid from the region on the side of the stream adjacent the one sidewall than from the region on the other side of the stream. In consequence, the pressure on the former side of the stream is reduced and a pressure gradient transversely of the jet is produced.

The pressure gradient deflects the stream closer to the aforesaid sidewall and the stream becomes even more effective in removing fluid from adjacent the sidewall. The action is cumulative and the stream is finally deflected into contact with said sidewall, locking on to the wall downstream of the orifice. The point at which "lock-on" occurs is known as the "point of attachment" and its location depends upon the relation between the width of the power stream orifice and of the interaction chamber near the power stream orifice; the angle that the sidewall or sidewalls make with respect to the centerline of the power stream; the length of the sidewall if a flow divider is not used; the spacing between the power stream orifice and the flow divider, if used; and the density, viscosity, compressibility and uniformity of the fluid. The region lying between the main stream and the sidewall and between the point of attachment and the power nozzle orifice is known as the boundary layer region, this region being at a pressure below ambient pressure of the system.

The two classes of amplifiers may be combined to cause a deflection of a power stream as a result of momentum interchange between one or more control streams and a transverse pressure differential across the power stream produced by the boundary layer effect provided by an adjacent sidewall.

In accordance with the present invention, there is provided a pure fluid amplifier including a power nozzle and at least one sidewall located such as to permit the stream to lock on to the sidewall. A readout tube is provided having an input orifice disposed in the boundary layer region in the absence of a control stream or flow. In consequence, the readout tube normally senses a pressure below ambient. A control means is provided for moving said power stream with respect to the input orifice of said readout tube such that the stream may be directed into said tube. The pressure in said tube is thus correlated with the position of the power stream and may be varied above and below ambient. The slope of the pressure function in said tube may be controlled by various parameters of the structure as will be discussed more fully subsequently.

It is an object of the present invention to provide a fluid amplifier having no moving parts which is capable of producing an output signal having a pressure which may be greater or less than ambient pressure of the system.

It is another object of the present invention to provide a fluid amplifier having no moving parts which is capable of producing an output signal smoothly variable between a maximum, substantially equal to the pressure of the power jet and a pressure less than the ambient pressure of the interaction region.

Another object of the present invention is to provide a fluid amplifier in which the threshold of response and the gain may be varied by means of a bias signal.

It is yet another object of the present invention to provide a fluid amplifier having no moving parts which is capable of producing an output signal which is variable between a relatively negative pressure and a relatively positive pressure as a substantially linear function of the input signal over a prescribed range.

The above and still further objects, features and advantages of the present invention will become apparent upon consideration of the following detailed description, especially when taken in conjunction with the accompanying drawings, wherein.

Figure 1:
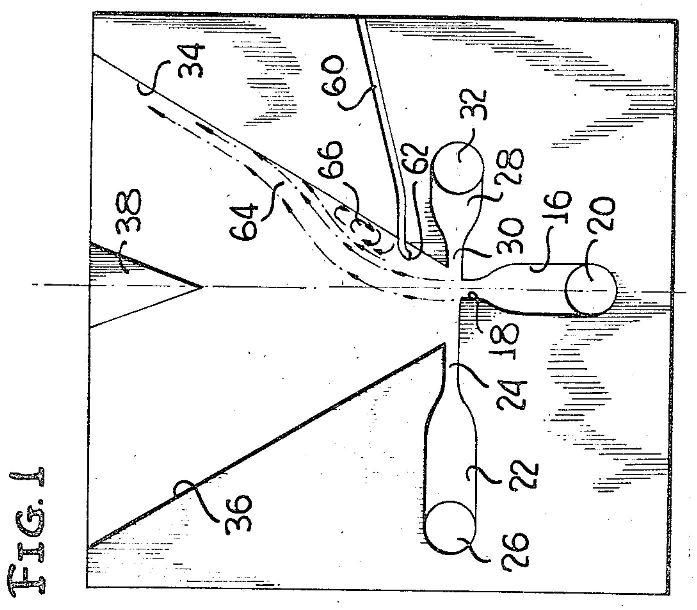
FIGURE 1 is a plan view of a pure fluid amplifier embodying the principles of the invention, showing the flow of the power jet in the absence of any control jets.
Figure 1A:
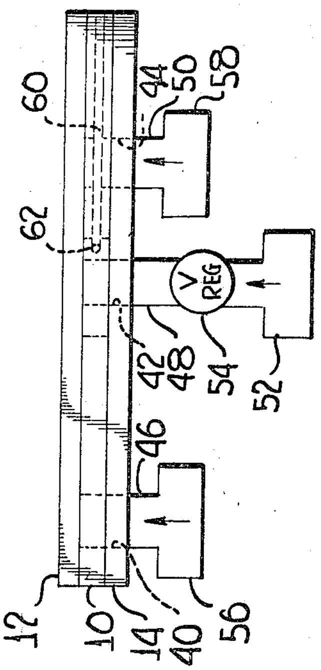
FIGURE 1A is a front view of FIGURE 1.

In FIGURES 1 and 1A, a pure fluid amplifier is illustrated comprising, for purposes of explanation only, three flat plates 10, 12 and 14. The plate 10 is formed with a plurality of cutouts therein providing the operating structure of the amplifier, while plates 12 and 14 serve as top and bottom cover plates, respectively. The three plates are tightly sealed together by suitable means such as adhesive or machine screws to prevent leakage between channels in the plate 10.

The configuration of the cutouts of plate 10 provides a power nozzle 16 having a constricted throat 18 and an orifice 20; a left control nozzle 22 having a constricted throat 24 and an aperture 26; a right control nozzle 28 having a constricted throat 30 and an aperture 32; and an interaction chamber defined by a right sidewall 34, a left sidewall 36. The apparatus may be provided with a flow divider 38. The control throats 24 and 30 are opposed to each other and are usually perpendicular to the power throat 18 which is here shown on a common centerline with the flow divider 38. The bottom of the right sidewall is adjacent the throat 18, while the left sidewall 36 is offset from the throat 18 by a distance greater than three times the width of the throat 18.

The plate 14 has bores 40, 42 and 44 therethrough which respectively overlook the apertures 26, 20 and 32. These bores are internally threaded to tightly receive tubes 46, 48 and 50, respectively. The distal end of the tube 48 is coupled to a source 52 of fluid under pressure. A fluid-regulating valve 54 may be used in conjunction with the source 52 to provide the power nozzle 16 with a continuous flow of fluid at a constant pressure. The distal end of the tube 50 is coupled to a source 58 of fluid under pressure to provide the right control nozzle 28 with a variable flow of fluid.

A readout tube 60 is disposed transversely through the plate 13 and has an inlet or pickup end 62 which stands up from the sidewall into the interaction region. The end 62 is bent over so that the inlet is directed generally upstream of the system.

When a power stream of fluid initially issues from the throat 18, it tends to divide equally on each side of the divider 38 and to vent to the atmosphere. The stream entrains fluid, which in this case is air, from the interaction region. As the upstream end of the right sidewall 34 is closely adjacent to the power jet as it issues from the throat 18, the return flow of fluid to replace the entrained fluid is smaller to this smaller volume on the right than it is to the larger volume on the left divided by the offset left wall 36 and the jet. Thus, a pressure is developed on the left of the stream which is higher on the left than on the right side of the stream. The power stream tends to be deflected towards the right, reducing the volume between the jet and the right wall. This condition is self-reinforcing; the smaller the volume, the greater the effect of fluid entrainment and the more difficult and smaller the return flow. Thus, the power stream 64 is deflected to the right wall 34, as shown in FIGURE 1, and develops a boundary layer region or bubble 66 immediately upstream of the point of attachment of the jet to the sidewall 34. The pressure in this bubble is below the ambient pressure of the fluid in the interaction chamber and thus, the pressure in the readout tube 60 is below ambient pressure.

Figure 4:
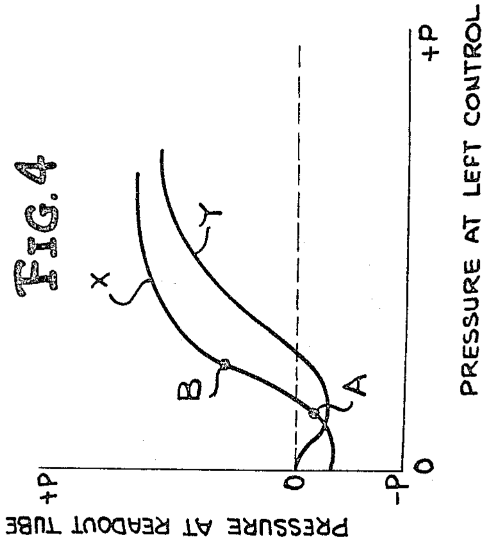
FIGURE 4 is a graph having curves illustrating the pressure at the readout tube as functions of the pressure of the left control jet under different modes of operation.

If sufficient flow is issued from the left control, the stream is deflected such that the inlet 62 of the readout tube becomes disposed within the power stream, thus receiving a pressure level which is higher than the ambient fluid pressure. In intermediate positions of the power stream, varying portions of the readout tube orifice 62 receive fluid from the stream, the remainder of the orifice 62 being subjected to boundary layer pressure. The tube 60 averages between the two pressures. In consequence, a smooth correlation results between differential changes of left control pressure and readout tube pressure as illustrated in FIGURE 4, curve X. It will be noted that the negative pressure between zero pressure and pressure A on the graph of FIGURE 4 is relatively constant. This is to be expected since the boundary layer pressure varies little regardless of the position of the stream relative to the sidewall so long as the stream is attached to the sidewall.

Of particular interest is the gain achievable with the apparatus of the present invention. The velocity gradient adjacent the edges of a free stream confined between top and bottom walls as in the present case is higher than along the edges of an unconfined free stream. Further, the velocity gradient adjacent that edge of a confined free stream which is subject to a boundary layer effect is greater than the other edge of the stream which is not subject to boundary layer effects. In consequence, the velocity gradient of the right edge of the stream issued by nozzle 16 is quite steep and relatively small changes in its position relative to orifice 62 produce large changes in pressure in the tube 60. This effect is exemplified by the steep slope of the curve X of FIGURE 4 between points A and B, the left control pressure A indicating the point at which the power stream has been deflected sufficiently to begin to supply fluid to the tube 60.

If a control stream of sufficient magnitude issues from the right control throat 30, the power stream is deflected away from the right sidewall. The pickup tube inlet then receives the ambient fluid pressure, approximately. Thus, the curve of FIGURE 4 can be made to start at ambient pressure, and fall to a lower pressure as the left control stream is turned on and the stream is deflected to the wall. The output function of such operation is designated by curve Y of FIGURE 4.

Figure 5:
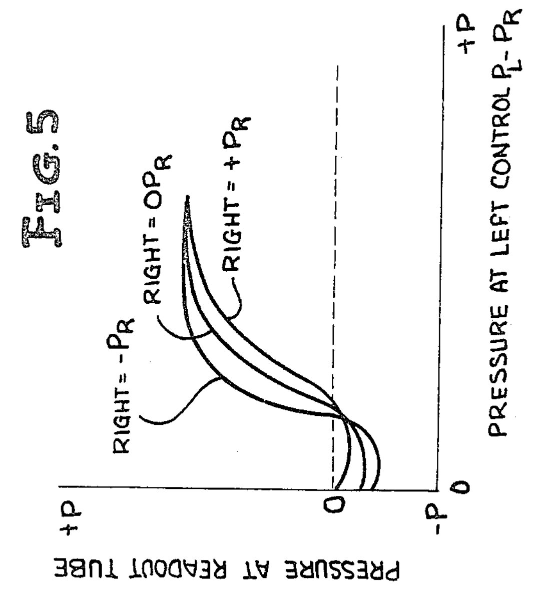
FIGURE 5 is a graph illustrating the pressure at the readout tube as a function of the pressure of the left control jet taken at three different fixed pressures of the right control jet.

Of more importance to the present application is the fact that the right control stream may be used as a bias or threshold control, as illustrated by the graphs of FIGURE 5. When operating the system so that the right control stream is employed as a bias, the system must be operated such that the power stream remains attached to the sidewall 34 at all times. If now fluid is introduced into the boundary layer bubble 66, the fluid thus supplied supplies part of the entrainment requirements of the power stream and the pressure in the region 66 is higher than would be the case if no fluid is supplied. This fact is exemplified by the curve $+P_R$. The curve $OP_R$ designates the condition when no fluid is supplied through the right control and is thus the same as the graph of FIGURE 4. If fluid is extracted from the boundary layer region 66, the initial pressure in this region is lower than in the prior case; this being exemplified by curve $-P_R$.

Specific features of these curves are of interest. Since, when fluid is introduced into the bubble, the pressure in the bubble is higher than otherwise, the control flow from the left control nozzle necessary to shift the power stream sufficiently to produce an effect in the readout tube 60 is higher than if there were no flow from the right control nozzle. Also, since the size of the bubble 66 is larger, the pressure in the bubble operates over a larger area of the power stream and is more effective in opposing the left control flow than if the bubble were smaller. This feature also effects the flow from the left control necessary to produce change in the readout tube 60. Since the graphs of FIGURE 5 are plotted against $P_L$—$P_R$, left control pressure and right control pressure, respectively, it is the latter phenomena cited above that causes the curve $+P_R$ to cross the zero pressure line to the right of the remainder of the curves and for the curve $OP_R$ to cross the zero pressure line to the right of curve $-P_R$.

The above phenomena is of importance in that it permits control of the threshold of response of the apparatus. If the pressure in the readout tube is sensed, for example, by a device having a threshold of response at zero pressure, the readout tube 60 does not respond to signals applied to the left control nozzle unit until the level of these signals rises sufficiently to cause the pressure in the readout tube to rise above zero pressure. As indicated above, this point is controlled by the bias signal applied to the right control nozzle; be it positive, negative or zero flow.

Another feature of importance is the fact that bias flow to the right control nozzle determines the slope of the output characteristic. As indicated above, the size of the bubble 66 is determined by the bias signal applied to the right control nozzle. More particularly, as control is introduced through the right control nozzle, not only does the stream move away from the right wall but its point of attachment moves downstream. As the left control signal is applied, the stream shifts to the right but the location of the point of attachment is not affected as much as might be expected and the area of the bubble is not reduced in direct proportion to the movement of the stream. The area of the bubble thus does not change in the same proportion as deflection of the stream. Thus, the area of the stream over which the pressure in the bubble is effective is different for each value of bias flow from the right control nozzle and thus, the slopes of the curves of FIGURE 5 vary with bias flow. In consequence, the gain of the system is variable with bias flow and provides a further and useful feature of the device.

When a control stream issues from the left throat 24, it increases the pressure on the left side of the power jet This causes the power stream to deflect more sharply, after issuing from the throat 18, towards the right wall, narrowing the boundary layer region and, more particularly, the distance between the stream and the sidewall 34 in the region of the inlet 62 of the tube 60.

Figure 2:
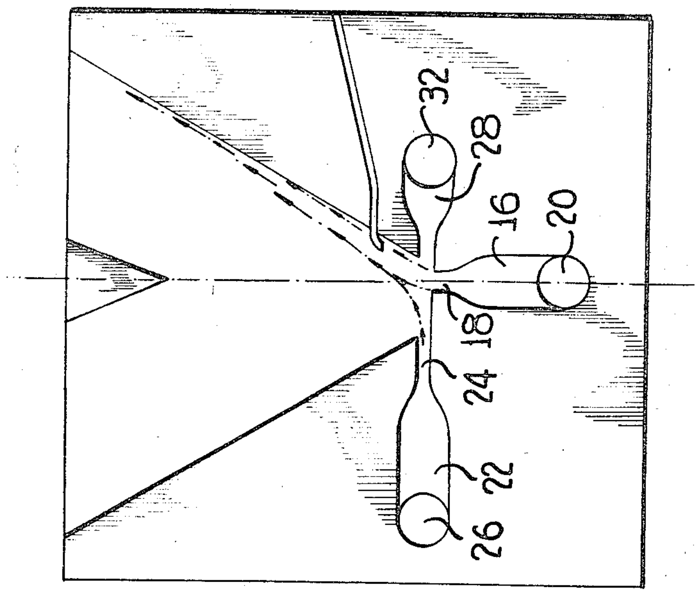
FIGURE 2 is a plan view of the structure of FIGURE 1, showing the flow of the power jet with a control jet applied.

The output signal from the pick-up tube 60 may be utilized in various ways. For example, the tube may be coupled to a mechanical bellows to impart a positive or negative movement to the bellows which is correlated to the combined pressures of the left and right control jets. Further, the tube may be used as an input to a control jet in a subsequent pure fluid amplifier stage such as is shown in FIGURE 2 of the U.S. Patent No. 3,122,165, to provide a positive or negative control pressure.

Although throughout the specification, reference has been made to a readout tube 60, in practice, readout is effected through a channel formed in the same plate as the various passages and nozzles of the amplifier.

Figure 6:
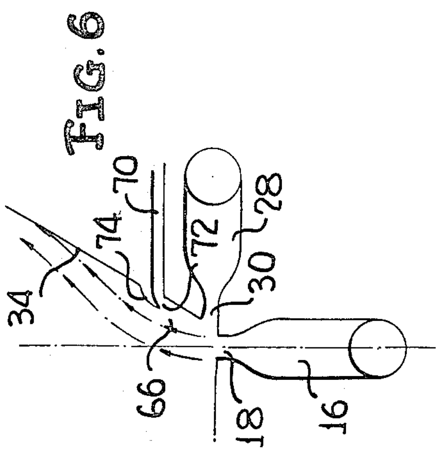
FIGURE 6 illustrates a preferred form of readout device.
Figure 3:
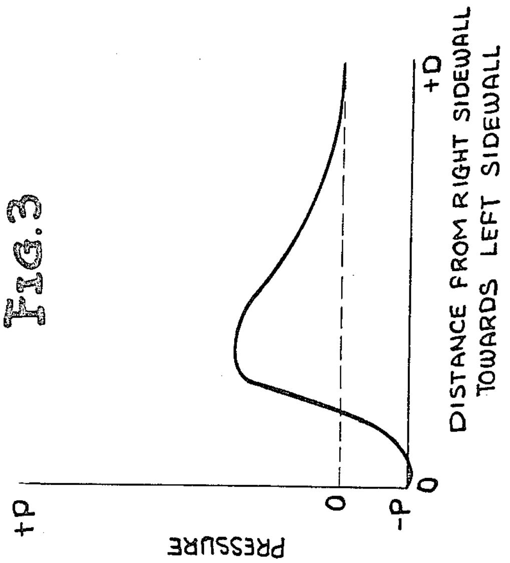
FIGURE 3 is a graph showing the pressure gradient along the line III—III in FIGURE 2.

Referring specifically to FIGURE 6 of the accompanying drawings, there is illustrated a preferred form of readout arrangement. A passage 70 is formed in the plate 10 and has an ingress orifice 72 opening into the boundary layer region 66. A cusp 74 extends into the region 66 from the sidewall 34 at the downstream edge of the orifice 72 and serves to divert fluid of the power stream, intercepted by the cusp, into the passage 70. In this way, the readout arrangement may be made integral with the fluid amplifier.

It should be noted that, although the device of the present invention is described as having the right sidewall closer to the stream, the positions of the right and left sidewalls may be exchanged and the control functions exchanged therewith. Also, in many cases, only one sidewall is required. In addition, it is not essential that the power stream attach to a sidewall wholly due to boundary layer effects. Stream attachment may require assistance from a control flow from the left control nozzle, as illustrated in FIGURE 1, or as a result of extraction of fluid through the right control nozzle.

While a specific embodiment of the invention has been described, it will be clear that variation of the details of construction which are specifically illustrated and described may be resorted to without departing from the true spirit and scope of the invention as defined in the appended claims.

What I claim is:

1. A fluid-operated system comprising:
an interaction chamber and means for issuing a stream of fluid under pressure into said interaction chamber;
a side wall defining at least one side of said interaction chamber and having a surface located with respect to said stream such that said stream may attach to said surface and form a boundary layer bubble between said stream and said surface;
a pressure responsive means located in said boundary layer bubble;
control means for deflecting said stream relative to said surface and said pressure responsive means such that varying portions of said pressure responsive means are subjected to said stream.

2. A fluid-operated system comprising:
an interaction chamber and means for issuing a stream of fluid under pressure into said interaction chamber;
a sidewall defining at least one side of said interaction chamber and having a surface located with respect to said stream such that said stream may attach to said surface and form a boundary layer bubble between said stream and said surface;
a pressure responsive means normally located in said boundary layer bubble;
control means for deflecting said stream of fluid with respect to said pressure responsive means so as to vary the pressure to which said pressure responsive means is subjected.

3. The system of claim 2 further comprising means for varying the rate of change of the pressure to which said pressure responsive means is subjected with respect to a given amount of deflection of said stream of fluid by said control means.

4. The system of claim 2 further comprising means for selectively controlling the size of said bubble in the absence of any deflection of said stream by said control means.

5. A fluid-operated system comprising:
an interaction chamber including a surface defining one side thereof;
means for issuing a stream of fluid into said chamber;
means for causing said stream to be deflected into contact with said surface and define a boundary layer region of reduced pressure between said surface and said stream;
pressure responsive means disposed within said boundary layer region;
and control means for varying the position of said stream relative to said pressure responsive means.

6. A fluid-operated system comprising:
an interaction chamber having a sidewall defining one side thereof, said sidewall including a surface, and an ambient fluid in said chamber;
means for issuing a stream of fluid having a pressure higher than said ambient fluid into said chamber;
means for selectively deflecting said stream with respect to said surface for providing a boundary layer bubble having a pressure lower than said ambient fluid, between said surface and said stream;
pressure responsive means disposed within said boundary layer bubble;
and control means for selectively deflecting said stream with respect to said pressure responsive means so that said pressure responsive means is selectively subjected to variable portions of said stream and said boundary layer bubble.

7. A fluid-operated system according to claim 6 further including means for issuing fluid into said boundary layer bubble.

8. A fluid-operated system according to claim 6 wherein said control means comprises a control nozzle for issuing a control stream of fluid against the side of said stream of fluid remote from said surface.

9. The combination according to claim 6 further comprising a second control means for selectively varying the fluid pressure in said boundary layer bubble.

10. The combination according to claim 9 wherein said second control means extracts fluid from said boundary layer bubble.

11. The system of claim 6 wherein said means for selectively deflecting includes means for issuing fluid against the side of said stream remote from said surface.

12. The system of claim 11 further including means for selectively varying the pressure in said boundary layer bubble.

13. A pure fluid system comprising:
an interaction chamber having at least one sidewall;

means for issuing a stream of fluid into said interaction chamber;

a flow divider positioned at the downstream end of said chamber to form at least one fluid outlet passage between a side of the divider and an extension of said sidewall;

means for causing said stream to lock on to said sidewall so as to provide a boundary layer bubble between said stream and said sidewall, such that said stream flows into said outlet passage;

pressure responsive means disposed adjacent said sidewall;

control means for selectively deflecting said stream with respect to said sidewall such that said pressure responsive means is subjected to varying portions of said stream and said boundary layer bubble.

14. The system of claim 13 wherein said means for causing comprises only boundary layer effects produced between said stream and said sidewall.

15. The system of claim 13 wherein said control means comprises means for directing a control stream of fluid against the side of said stream remote from said sidewall.

16. The system of claim 15 wherein said means for causing includes said means for directing a control stream.

17. A pure fluid system comprising:

an interaction chamber having a sidewall defining at least one side thereof;

means for issuing a stream of fluid into said interaction chamber;

means for causing said stream to lock on to said sidewall such that a boundary layer bubble is formed between said stream and said sidewall;

control means for selectively deflecting said stream to vary the size of said bubble;

pressure responsive means, positioned adjacent said sidewall so as to receive varying portions of said stream and said bubble, for providing a fluid pressure signal which varies as a predetermined function of said control means.

18. The system of claim 17 further comprising bias means for varying said predetermined function.

References Cited

UNITED STATES PATENTS

| | | | |
|---|---|---|---|
| 2,841,182 | 7/1958 | Scala | 138—37 |
| 3,001,539 | 9/1961 | Hurvitz | 137—81.5 |
| 3,016,063 | 1/1962 | Hausmann | 137—81.5 |
| 3,170,476 | 2/1965 | Reilly | 137—81.5 |
| 3,171,422 | 3/1965 | Evans | 137—81.5 |
| 3,212,515 | 10/1965 | Zisfein et al. | 137—81.5 |
| 3,244,189 | 4/1966 | Bailey | 137—81.5 |

M. CARY NELSON, *Primary Examiner.*

S. SCOTT, *Assistant Examiner.*